United States Patent
Serra et al.

(10) Patent No.: US 7,152,642 B2
(45) Date of Patent: Dec. 26, 2006

(54) TIRE FOR A VEHICLE WHEEL AND PROCESS FOR PRODUCING THE TIRE

(75) Inventors: Antonio Serra, Genoa (IT); Marco Nahmias Nanni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 308 days.

(21) Appl. No.: 10/381,313

(22) PCT Filed: Sep. 20, 2001

(86) PCT No.: PCT/EP01/10884

§ 371 (c)(1),
(2), (4) Date: Sep. 5, 2003

(87) PCT Pub. No.: WO02/26878

PCT Pub. Date: Apr. 4, 2002

(65) Prior Publication Data

US 2004/0045650 A1    Mar. 11, 2004

(30) Foreign Application Priority Data

Sep. 26, 2000  (EP)  ................................ 00120882

(51) Int. Cl.
| | |
|---|---|
| B29D 30/52 | (2006.01) |
| B32B 23/04 | (2006.01) |
| B32B 37/00 | (2006.01) |
| B60C 1/00 | (2006.01) |
| B60C 11/00 | (2006.01) |
| C08C 19/36 | (2006.01) |
| C08L 13/00 | (2006.01) |

(52) U.S. Cl. ................ 152/209.5; 156/123; 156/128.1; 156/338; 428/493

(58) Field of Classification Search ............ 152/209.5; 156/123, 128.1, 110.1, 338; 428/493
See application file for complete search history.

(56) References Cited

U.S. PATENT DOCUMENTS

| 2,724,707 A | | 11/1955 | Brown et al. |
| 2,947,338 A | * | 8/1960 | Reid et al. .................. 152/905 |
| 4,341,672 A | | 7/1982 | Hsieh et al. |
| 4,396,052 A | * | 8/1983 | Ahagon et al. .......... 152/209.5 |

(Continued)

FOREIGN PATENT DOCUMENTS

EP          0 199 064 B1       10/1986

(Continued)

OTHER PUBLICATIONS

Lee et al, Epoxy Resins, pp. 18-21, 1957.*

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A tire for a vehicle wheel includes at least one first component and at least one second component. The at least one first component includes a first elastomeric material crosslinked in substantial absence of sulfur. The at least one second component includes a second elastomeric material crosslinked with sulfur. The at least one first component is in contact with the at least one second component. The first elastomeric material includes an elastomeric polymer including carboxylic groups. The first elastomeric material is crosslinked by reacting the elastomeric polymer including carboxylic groups with an epoxidized liquid organic compound. The epoxidized liquid organic compound comprises epoxide groups located internally along a molecule of the epoxidized liquid organic compound. The second elastomeric material includes at least one elastomeric polymer functionalized with at least one epoxide group, at least one carboxylic group, or at least one epoxide group and at least one carboxylic group.

51 Claims, 1 Drawing Sheet

U.S. PATENT DOCUMENTS

| | | | |
|---|---|---|---|
| 4,768,937 A | 9/1988 | Singh | |
| 4,851,556 A | 7/1989 | Siegmeier et al. | |
| 4,872,822 A | 10/1989 | Pizzorno | |
| 5,366,846 A | 11/1994 | Knudsen et al. | |
| 5,462,979 A | 10/1995 | Sandstrom | |
| 5,959,062 A * | 9/1999 | Ohtsuka et al. | 528/176 |
| 2002/0042479 A1* | 4/2002 | Nanni et al. | 152/905 |
| 2003/0062104 A1* | 4/2003 | Kanenari et al. | 152/524 |
| 2003/0075253 A1* | 4/2003 | Serra et al. | 152/525 |
| 2004/0099358 A1* | 5/2004 | Nahmias Nanni et al. | 152/151 |
| 2004/0102557 A1* | 5/2004 | Nanni et al. | 152/905 |

FOREIGN PATENT DOCUMENTS

| | | | |
|---|---|---|---|
| EP | 0 242 840 A1 | | 10/1987 |
| EP | 0 675 162 A1 | | 10/1995 |
| EP | 0 928 680 A1 | | 7/1999 |
| EP | 0 928 702 A1 | | 7/1999 |
| FR | 2187808 | * | 2/1974 |
| GB | 2197654 | * | 5/1988 |
| IT | 1245551 | * | 9/1994 |
| JP | 57-125230 | * | 8/1982 |
| WO | WO 01/14470 A1 | | 3/2001 |

OTHER PUBLICATIONS

D. N. Schulz, et al., "Recent Advances in the Chemical Modification of Unsaturated Polymers", Rubber Chemistry and Technology, vol. 55, pp. 809-859, (1982).

H. P. Brown, "Carboxylic Elastomers", Rubber Chemistry and Technology, vol. XXX, pp. 1347-1387, (1957).

* cited by examiner

FIG. 1

TIRE FOR A VEHICLE WHEEL AND PROCESS FOR PRODUCING THE TIRE

The present invention relates to a tyre for a vehicle wheel and to a process for producing it.

More particularly, the present invention relates to a tyre for a vehicle wheel, comprising at least one component comprising an elastomeric material which is crosslinked in substantial absence of sulphur, brought into contact with at least one component comprising an elastomeric material which is crosslinked with sulphur.

The present invention moreover relates to a process for producing said tyre.

Processes for vulcanizing diene elastomers with sulphur are widely used in the rubber industry for the production of a wide range of products, and in particular tyres for vehicle wheels. Implementation of these processes although giving high-quality vulcanized products, shows a considerable complexity, due to the fact that, in order to obtain optimum vulcanization within industrially acceptable times, it is necessary to use a complex vulcanizing system which includes, besides sulphur or sulphur-donating compounds, one or more activators (for example stearic acid, zinc oxide and the like) and one or more accelerators (for example thiazoles, dithiocarbamates, thiurams, guanidines, sulphenamides and the like). The presence of these products can, in some cases, entail considerable problems in terms of the harmfulness/toxicity both during production and during use, in particular when the vulcanized products are intended for medical/health-care or food use. In addition, it is known that the use of sulphur or sulphur-donating compounds leads, during the vulcanization step which is generally carried out at temperatures above 150° C., to development of volatile sulphur-containing compounds.

Consequently, in recent years, research efforts have been directed along two different lines, the first being to improve the known vulcanization processes in order to make them more efficient and cleaner, the second aimed at developing alternative techniques to crosslinking with sulphur which would give similar results and would simultaneously afford an effective simplification in terms of production.

Patent application 99EP-116676.0 of Aug. 26, 1999 in the name of the Applicant, which is incorporated herein by way of reference, discloses crosslinked products, and in particular tyres for vehicle wheels, which can be produced in substantial absence of additional crosslinking agents, by using self-crosslinking compositions comprising a mixture between an elastomeric polymer containing carboxylic groups and a liquid organic compound containing epoxide groups which are located internally along the molecule. After heating, said compositions achieve a high degree of crosslinking without addition of conventional crosslinking agents, with crosslinking times that are maintained within industrially acceptable limits. The resulting crosslinked product combines excellent mechanical and elastic performance qualities (in particular stress at break, elongation at break, modulus and hardness) with low values of abradability, which are such as to make the self-crosslinking compositions above particularly suitable as elastomeric materials to be used for the production of tyres, in particular tread bands.

It is known that tyres can be prepared by means of a process including a plurality of manufacturing steps. More particularly, said process comprises the steps of preparing beforehand and separately from each other a series of semi-finished articles corresponding to the various parts of the tyre (carcass plies, belt strips, bead wires, beads, fillers, sidewalls and tread bands) which are then assembled together using a suitable manufacturing machine. The subsequent crosslinking step welds the abovementioned semi-finished articles together to give a monolithic block, i.e. the tyre. Alternative processes for producing a tyre or tyre parts without using semi-finished products are disclosed, for example, in patent applications EP 928,680 and EP 928,702.

Thus, in a tyre, the coupling between adjacent components is achieved during the crosslinking process. The high stability of said coupling prevents the occurrence of detachment between said components, thus ensuring high performance qualities and a long life for the finished tyre. In this respect, the Applicant has encountered difficulties in stably coupling components obtained by crosslinking an elastomeric material which is crosslinkable in substantial absence of sulphur with components obtained by crosslinking elastomeric materials which are crosslinkable with sulphur. In particular, the Applicant has encountered difficulties in the coupling between the tread band obtained by crosslinking, in substantial absence of sulphur, an elastomeric material comprising an elastomeric polymer containing carboxylic groups and an epoxidized liquid organic compound containing epoxide groups located along the molecule and the underlying reinforcing layers made of composite elastomeric material, and, more particularly, in the coupling between said tread band and the radially outermost reinforcing layer, generally consisting of reinforcing cords, typically textile cords, arranged at an angle of a few degrees with respect to a circumferential direction, which are coated and welded together by means of an elastomeric material crosslinked with sulphur (this reinforcing layer is commonly known as a "zero degrees belt" or "0° belt").

The Applicant has now found that it is possible to stably couple a component obtained by crosslinking an elastomeric material which is crosslinkable in substantial absence of sulphur with a component obtained by crosslinking an elastomeric material which is crosslinkable with sulphur, by using as material which is crosslinkable in substantial absence of sulphur at least one elastomeric polymer containing carboxylic groups mixed with at least one epoxidized liquid organic compound containing epoxide groups located internally along the molecule, and by adding to the elastomeric material which is crosslinkable with sulphur at least one elastomeric polymer functionalized with at least one group chosen from epoxide and carboxyl.

According to a first aspect, the present invention thus relates to a tyre for a vehicle wheel, comprising at least one first component comprising an elastomeric material which is crosslinked in substantial absence of sulphur, and at least one second component comprising an elastomeric material which is crosslinked with sulphur, said first component being in contact with said second component, in which:

said elastomeric material which is crosslinked in substantial absence of sulphur, forming part of said first component, comprises an elastomeric polymer containing carboxylic groups which is crosslinked by reaction with an epoxidized liquid organic compound containing epoxide groups located internally along the molecule;

said elastomeric material which is crosslinked with sulphur, forming part of said second component, comprises at least one elastomeric polymer functionalized with at least one group chosen from epoxide and carboxyl.

For the purpose of the present description and the claims, the expression "elastomeric polymer functionalized with at least one group chosen from epoxide and carboxyl" means an elastomeric polymer containing epoxide groups, or carboxylic groups, or epoxide groups and carboxylic groups.

In accordance with one preferred embodiment, said tyre for a vehicle wheel comprises the following components:
- at least one rubber-coated carcass ply, the opposite lateral edges of which are associated with respective right-hand and left-hand bead wires, each bead wire being encased in a respective bead;
- a belt structure comprising at least one belt strip applied along the circumferential extension of said rubber-coated carcass ply;
- a tread band applied along the circumferential extension of said belt structure;
- right-hand and left-hand sidewalls applied externally on said rubber-coated carcass ply, said sidewalls extending, in an axially external position, from the respective bead to the respective end of the belt structure;

said first component being the tread band.

According to a first preferred embodiment, said first component is the tread band and said second component is a reinforcing layer placed between said belt structure and said tread band, comprising a plurality of reinforcing cords coated and welded together by means of the elastomeric material which is crosslinked with sulphur. Even more preferably, according to said first preferred embodiment, the tyre also comprises a strip placed in the connecting zone between said sidewalls and said tread band, said strip consisting of the elastomeric material crosslinked with sulphur.

According to a second preferred embodiment, said first component is the tread band and said second component is a layer of the elastomeric material which is crosslinked with sulphur, placed between said tread band and said belt structure.

According to a further aspect, the present invention relates to a process for producing tyres for vehicle wheels, said process comprising the following steps:
- manufacturing a green tyre comprising at least one first component comprising an elastomeric material which is crosslinkable in substantial absence of sulphur, and at least one second component comprising an elastomeric material which is crosslinkable with sulphur, said first component being in contact with said second component;
- subjecting the green tyre to a moulding in a mould cavity defined in a vulcanization mould;
- crosslinking said elastomeric materials by heating the tyre to a predetermined temperature for a predetermined time;

characterized in that:
said elastomeric material which is crosslinkable in substantial absence of sulphur, forming part of said first component, comprises an elastomeric polymer containing carboxylic groups and an epoxidized liquid organic compound containing epoxide groups located internally along the molecule;
said elastomeric material which is crosslinkable with sulphur, forming part of said second component, comprises at least one elastomeric polymer functionalized with at least one group chosen from epoxide and carboxyl.

According to one preferred embodiment, the crosslinking step is carried out by heating the elastomeric materials to a temperature of between 100° C. and 250° C., preferably between 120° C. and 200° C.

According to a further aspect, the present invention relates to a method for coupling a component comprising an elastomeric material which is crosslinkable in substantial absence of sulphur with a component comprising an elastomeric material which is crosslinkable with sulphur, said method comprising the following steps:
- bringing into contact said components made of elastomeric material;
- crosslinking said elastomeric materials by heating to a predetermined temperature for a predetermined time;

characterized in that:
said elastomeric material which is crosslinkable in substantial absence of sulphur comprises an elastomeric polymer containing carboxylic groups and an epoxidized liquid organic compound containing epoxide groups located internally along the molecule;
said elastomeric material which is crosslinkable with sulphur comprises at least one elastomeric polymer functionalized with at least one group chosen from epoxide and carboxyl.

According to one preferred embodiment, the crosslinking step is carried out by heating the elastomeric materials to a temperature of between 100° C. and 250° C., preferably between 120° C. and 200° C.

According to a further aspect, the present invention relates to a crosslinked elastomeric product comprising at least one first component comprising an elastomeric material which is crosslinked in substantial absence of sulphur, and at least one second component comprising an elastomeric material which is crosslinked with sulphur, said first component being in contact with said second component, in which:
said elastomeric material which is crosslinked in substantial absence of sulphur, forming part of said first component, comprises an elastomeric polymer containing carboxylic groups which is crosslinked by reaction with an epoxidized liquid organic compound containing epoxide groups located internally along the molecule;
said elastomeric material which is crosslinked with sulphur, forming part of said second component, comprises at least one elastomeric polymer functionalized with at least one group chosen from epoxide and carboxyl.

According to a particularly preferred embodiment, the elastomeric material which is crosslinked with sulphur comprises at least one elastomeric polymer functionalized with at least one epoxide group.

According to one preferred embodiment, the elastomeric polymer containing carboxylic groups (also referred to for simplicity hereinbelow as "carboxylated elastomeric polymer") which can be used in accordance with the present invention both in the elastomeric material which is crosslinkable in the absence of sulphur and in the elastomeric material which is crosslinkable with sulphur, is selected from homopolymers or copolymers with elastomeric properties, which have a glass transition temperature ($T_g$) of less than 23° C., preferably less than 0° C. Said carboxylated elastomeric polymer contains at least 0.1 mol %, preferably from 1 mol % to 30 mol %, even more preferably from 2 mol % to 10 mol %, of carboxylic groups relative to the total number of moles of monomers present in the polymer. Mixtures of various elastomeric polymers containing carboxylic groups, or mixtures of one or more carboxylated elastomeric polymers with one or more non-carboxylated elastomeric polymers, also fall within the present definition.

In the case of copolymers, these can have a random, blocked, grafted or mixed structure. The average molecular weight of the carboxylated elastomeric polymer is preferably between 2,000 and 1,000,000, more preferably between 50,000 and 500,000.

Carboxylated diene homopolymers or copolymers in which the base polymer structure, of synthetic or natural origin, is derived from one or more conjugated diene monomers, optionally copolymerized with monovinylarenes and/or polar comonomers, are preferred in particular. Preferably, the base polymer structure is derived from the (co)polymerization of diene monomers containing from 4 to 12, preferably from 4 to 8, carbon atoms, chosen, for example, from: 1,3-butadiene, isoprene, 2,3-dimethyl-1,3-butadiene, 3-butyl-1,3-octadiene, 2-phenyl-1,3-butadiene and the like, or mixtures thereof. 1,3-Butadiene and isoprene are particularly preferred.

Monovinylarenes which can optionally be used as comonomers generally contain from 8 to 20, preferably from 8 to 12, carbon atoms and can be chosen, for example, from: styrene; 1-vinylnaphthalene; 2-vinyl-naphthalene; various alkyl, cycloalkyl, aryl, alkylaryl or arylalkyl derivatives of styrene, such as, for example: 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene and the like, or mixtures thereof. Styrene is particularly preferred. These monovinylarenes can optionally be substituted with one or more functional groups, such as alkoxy groups, for example 4-methoxystyrene, amino groups, for example 4-dimethylaminostyrene, and the like.

Various polar comonomers can be introduced into the base polymer structure, in particular vinylpyridine, vinylquinoline, acrylic and alkylacrylic acid esters, nitriles and the like, or mixtures thereof, such as, for example: methyl acrylate, ethyl acrylate, methyl methacrylate, ethyl methacrylate and acrylonitrile.

Among the base polymer structures which are particularly preferred are: natural rubber, polybutadiene, polyisoprene, styrene/butadiene copolymers, butadiene/isoprene copolymers, styrene/isoprene copolymers, butadiene/acrylonitrile copolymers and the like, or mixtures thereof.

In the case of base structures of copolymer type, the amount of diene comonomer relative to the other comonomers is such as to ensure that the final polymer has elastomeric properties. In this sense, it is not possible generally to establish the minimum amount of diene comonomer required to obtain the desired elastomeric properties. As an indication, an amount of diene comonomer of at least 50% by weight relative to the total weight of the comonomers can generally be considered sufficient.

The preparation of the base polymer can be carried out according to known techniques, generally by (co)polymerization of the corresponding monomers in emulsion, in suspension or in solution.

To introduce carboxylic groups, the base polymer thus obtained can be made to react with a carboxylating agent in the presence of a radical initiator, preferably an organic peroxide (for example dicumyl peroxide or benzoyl peroxide). Carboxylating agents commonly used are, for example: maleic anhydride, itaconic anhydride, thioglycolic acid, β-mercaptopropionic acid and the like.

The introduction of carboxylic groups can also be carried out during the synthesis of the polymer by copolymerization between a conjugated diene, optionally mixed with monovinylarenes and/or polar comonomers, as reported above, and an olefinic monomer containing one or more carboxylic groups, or a derivative thereof. Carboxylated olefinic monomers usually used are, for example: acrylic acid, methacrylic acid, sorbic acid, β-acryloxypropanoic acid, ethacrylic acid, 2-ethyl-3-propylacrylic acid, vinylacrylic acid, itaconic acid, cinnamic acid, maleic acid, fumaric acid and the like, or mixtures thereof. Within this class of carboxylated elastomeric polymers, the following are particularly preferred: 1,3-butadiene/(meth)acrylic acid copolymers, 1,3-butadiene/acrylonitrile/(meth)acrylic acid copolymers, 1,3-butadiene/styrene/(meth)acrylic acid copolymers and the like, or mixtures thereof.

Alternatively, the corresponding carboxylic derivatives can be used, in particular anhydrides, esters, nitriles or amides. In this case, the polymer obtained is then subjected to hydrolysis so as to convert, partially or totally, the functional groups thus introduced into free carboxylic groups.

Carboxylated elastomeric polymers which may also be used are elastomeric copolymers of one or more monoolefins with an olefinic comonomer containing one or more carboxylic groups or derivatives thereof. The monoolefins can be chosen from: ethylene and α-olefins generally containing from 3 to 12 carbon atoms, such as, for example: propylene, 1-butene, 1-pentene, 1-hexene, 1-octene and the like, or mixtures thereof. The following are preferred: copolymers of ethylene and an α-olefin, and optionally a diene; homopolymers of isobutene or copolymers thereof with small amounts of a diene, which are optionally at least partially halogenated. The diene optionally present contains, in general, from 4 to 20 carbon atoms, and is preferably chosen from: 1,3-butadiene, isoprene, 1,4-hexadiene, 1,4-cyclohexadiene, 5-ethylidene-2-norbornene, 5-methylene-2-norbornene and the like. Of these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; and the like, or mixtures thereof. Carboxylated olefinic comonomers can be chosen from those mentioned above for the diene polymers. When a diene comonomer is present, it can be used to introduce carboxylic groups by means of the carboxylation reaction as described above.

Further information regarding the structure and the processes for producing carboxylated elastomers are given, for example, in the article by H. P. Brown in *Rubber Chemistry and Technology*, Vol. XXX, 5, page 1347 et seq (1957) or in U.S. Pat. No. 2,724,707.

According to a particularly preferred embodiment, said carboxylated elastomeric polymer is carboxylated acrylonitrile-butadiene rubber (XNBR).

Examples of carboxylated acrylonitrile-butadiene rubber which can be used in the present invention and which are currently commercially available are the products Nipol® EP (Nippon Zeon) or the products of the series Krynac® X (Bayer).

According to a preferred embodiment, the epoxidized liquid organic compound containing epoxide groups located internally along the molecule (for simplicity, this is referred to hereinbelow as an "organic compound containing internal epoxide groups" or even "epoxidized organic compound") is chosen from products of hydrocarbon type which are, at room temperature, in the form of viscous liquids or oils.

These compounds contain at least two internal epoxide groups, i.e. groups in which one oxirane bridge connects:
(i) two adjacent carbon atoms located on the main chain, with the condition that neither of the said two adjacent carbon atoms is a terminal carbon atom of this chain; or
(ii) two adjacent carbon atoms located on a side chain.

The presence of internal epoxide groups does not, however, exclude the possibility of epoxide groups in a terminal position also being present in the molecule.

At least two internal epoxide groups are present in the liquid organic compounds according to the present invention. In general, the amount of epoxide groups is such that the epoxide equivalent weight of the epoxidized compound is usually between 40 and 2,000, preferably between 50 and 1,500, more preferably between 100 and 1,000. The term "epoxide equivalent weight" (EEW) means the molecular weight of the epoxidized compound per mole of oxirane oxygen, or:

$$EEW = \frac{1600}{\% \, O}$$

where % O is the content of oxirane oxygen, expressed as a percentage by weight of oxirane oxygen relative to the total weight of the compound. The content of oxirane oxygen in the epoxidized compounds can be determined according to known techniques, for example by titration with a solution of hydrobromic acid in acetic acid.

One class of liquid organic compounds containing internal epoxide groups which are particularly preferred is that of epoxidized oils, which can be obtained by epoxidation of unsaturated fatty acids or esters (in particular glycerides, diglycerides or triglycerides) of unsaturated fatty acids, of synthetic or natural origin, or alternatively by epoxidation of mixtures of said unsaturated acids or esters with saturated fatty acids or esters thereof. The saturated or unsaturated fatty acids generally contain from 10 to 26 carbon atoms, preferably from 14 to 22 carbon atoms.

Examples of unsaturated fatty acids are: myristoleic acid, palmitoleic acid, oleic acid, gadoleic acid, erucic acid, ricinoleic acid, linoleic acid, linolenic acid, arachidonic acid and the like, or mixtures thereof.

Examples of saturated fatty acids are: lauric acid, myristic acid, palmitic acid, stearic acid, behenic acid and the like, or mixtures thereof.

Vegetable oils such as, for example: epoxidized linseed oil, epoxidized safflower oil, epoxidized soybean oil, epoxidized corn oil, epoxidized cottonseed oil, epoxidized rapeseed oil, epoxidized castor oil, epoxidized tung oil, epoxidized tall oil, octyl epoxytallate, epoxidized sunflower oil, epoxidized olive oil and the like, or mixtures thereof, are particularly preferred. The epoxidized oils generally have a freezing temperature of less than 23° C., preferably less than 10° C. Products of this type can be found on the market, for example, under the brand names Epoxol® (FACI, American Chemical Service Inc.); Paraplex®, Plasthall® and Monoplex® (C. P. Hall); Vikoflex® and Ecepox® (Elf Atochem).

Another class of liquid organic compounds containing internal epoxide groups which can be used advantageously according to the present invention consists of epoxidized diene oligomers, in which the base polymer structure, of synthetic or natural origin, is derived from one or more conjugated diene monomers, optionally copolymerized with other monomers containing ethylenic unsaturation. These oligomers generally have an average molecular weight (number-average), which can be determined, for example, by gel permeation chromatography (GPC), of between 500 and 10,000, preferably between 1,000 and 8,000.

Oligomers derived from the (co)polymerization of conjugated diene monomers containing from 4 to 12, preferably from 4 to 8, carbon atoms, chosen, for example, from: 1,3-butadiene, isoprene, chloroprene, 2,3-dimethyl-1,3-butadiene, 3-butyl-1,3-octadiene, 2-phenyl-1,3-butadiene and the like, or mixtures thereof, are particularly preferred. 1,3-Butadiene and isoprene are particularly preferred.

The diene monomers can optionally be copolymerized with other monomers containing ethylenic unsaturation, such as, for example: α-olefins containing from 2 to 12 carbon atoms (for example ethylene, propylene or 1-butene), monovinylarenes containing from 8 to 20 carbon atoms (for example styrene, 1-vinylnaphthalene or 3-methylstyrene), vinyl esters in which the ester group contains from 2 to 8 carbon atoms (for example vinyl acetate, vinyl propionate or vinyl butanoate), alkyl acrylates and alkyl methacrylates in which the alkyl contains from 1 to 8 carbon atoms (for example ethyl acrylate, methyl acrylate, methyl methacrylate, tertbutyl acrylate or n-butyl acrylate), acrylonitrile and the like, or mixtures thereof.

Among the epoxidized diene oligomers which are preferred are those derived from the epoxidation of oligomers of: 1,3-butadiene; isoprene; 1,3-butadiene and styrene; 1,3-butadiene and isoprene; isoprene and styrene; 1,3-butadiene and acrylonitrile; and the like. Epoxidized oligomers of 1,3-butadiene or of isoprene are particularly preferred.

Epoxidized diene oligomers which can be used in the present invention are commercially available, for example under the brand name Poly BD® from Elf Atochem. The epoxidation reaction of a compound containing internal alkylene groups can be carried out according to known techniques. For example, the starting material can be subjected to direct oxidation using a suitable oxidizing agent such as a peracid (in particular perbenzoic acid, metachloroperbenzoic acid, peracetic acid, trifluoroperacetic acid, perpropionic acid and the like) or an alkaline oxidizing agent (for example hydrogen peroxide mixed with aqueous sodium hydroxide solution), or alternatively by reaction with oxygen gas in the presence of a catalyst (for example Ag). Alternatively, it is possible to carry out selective oxidation reaction of the internal alkylene groups by formation of a halohydrin by reaction with a halogen (for example $Cl_2$ or $Br_2$) in the presence of water, followed by alkaline treatment with formation of the epoxide groups. Further details regarding the epoxidation reactions are given, for example, in U.S. Pat. Nos. 4,341,672, 4,851,556 and 5,366,846.

In the elastomeric material which is crosslinkable in the absence of sulphur, the epoxidized liquid compound is mixed with the carboxylated elastomeric polymer in proportions which vary as a function of the amount of functional groups present and as a function of the elastic properties which it is desired to obtain for the final product. In general, the amount of epoxidized liquid compound can range between 5 and 200 parts by weight, preferably between 10 and 120 parts by weight, per 100 parts by weight of elastomeric polymer.

Said elastomeric material which is crosslinkable in the absence of sulphur can comprise reinforcing fillers (for example carbon black, silica, alumina, aluminosilicates, calcium carbonate, kaolin and the like, or mixtures thereof), antioxidants, anti-ageing agents, protective agents, plasticizers, compatibilizing agents for the reinforcing filler, adhesives, anti-ozone agents, modifying resins, fibres (for example Kevlar® pulp), lubricants (for example mineral oils, vegetable oils, synthetic oils and the like, or mixtures thereof), condensation catalysts (for example metal carboxylates, arylsulphonic acids or derivatives thereof, strong inorganic bases or acids, amines and alkanolamines and the like, or mixtures thereof), and the like.

According to one preferred embodiment, the elastomeric polymer containing epoxide groups (this is also referred to for simplicity hereinbelow as the "epoxidized elastomeric polymer") is chosen from homopolymers or copolymers with elastomeric properties, which have a glass transition temperature ($T_g$) of less than 23° C., preferably less than 0° C. Said epoxidized elastomeric polymer contains at least 0.05 mol %, preferably from 0.1 mol % to 70 mol %, even more preferably from 0.5 mol % to 60 mol %, of epoxide groups relative to the total number of moles of monomers present in the polymer. Mixtures of various elastomeric polymers containing epoxide groups, or mixtures of one or more elastomeric polymers epoxidized with one or more non-epoxidized elastomeric polymers, also fall within the present definition.

In the case of copolymers, these can have a random, blocked, grafted or mixed structure. The average molecular weight of the elastomeric polymer containing epoxide groups is preferably between 2,000 and 1,000,000 and more preferably between 50,000 and 500,000.

Epoxidized diene homopolymers or copolymers in which the base polymer structure, of synthetic or natural origin, is derived from one or more conjugated diene monomers, optionally copolymerized with monovinylarenes and/or polar comonomers, are preferred in particular.

The polymers that are particularly preferred are those derived from the (co)polymerization of diene monomers containing from 4 to 12 and preferably from 4 to 8 carbon atoms, chosen, for example, from: 1,3-butadiene, isoprene, 2,3-dimethyl-1,3-butadiene, 3-butyl-1,3-octadiene, 2-phenyl-1,3-butadiene and the like, or mixtures thereof. 1,3-Butadiene and isoprene are particularly preferred.

Monovinylarenes which can optionally be used as comonomers generally contain from 8 to 20, preferably from 8 to 12, carbon atoms and can be chosen, for example, from: styrene; 1-vinylnaphthalene; 2-vinylnaphthalene; various alkyl, cycloalkyl, aryl, alkylaryl or arylalkyl derivatives of styrene, such as, for example: 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene and the like, or mixtures thereof. Styrene is particularly preferred. These monovinylarenes can optionally be substituted with one or more functional groups, such as alkoxy groups, for example 4-methoxystyrene, amino groups, for example 4-dimethylaminostyrene, and the like.

Various polar comonomers can be introduced into the base polymer structure, in particular vinylpyridine, vinylquinoline, acrylic and alkylacrylic acid esters, nitrites and the like, or mixtures thereof, such as, for example: methyl acrylate, ethyl acrylate, methyl methacrylate, ethyl methacrylate, acrylonitrile, and the like.

Of the base polymer structures, the following are particularly preferred: natural rubber, polybutadiene, polyisoprene, styrene/butadiene copolymers, butadiene/isoprene copolymers, styrene/isoprene copolymers, nitrile rubbers and the like, or mixtures thereof.

In the case of copolymers, the amount of diene comonomer relative to the other comonomers is such as to ensure that the final polymer has elastomeric properties. In this sense, it is not possible generally to establish the minimum amount of diene comonomer required to obtain the desired elastomeric properties. As an indication, an amount of diene comonomer of at least 50% by weight relative to the total weight of the comonomers can generally be considered sufficient.

The base diene polymer can be prepared according to known techniques, generally in emulsion, in suspension or in solution. The base polymer thus obtained is then subjected to epoxidation according to known techniques, for example by reaction in solution with an epoxidizing agent. This agent is generally a peroxide or a peracid, for example m-chloroperbenzoic acid, peracetic acid and the like, or hydrogen peroxide in the presence of a carboxylic acid or a derivative thereof, for example acetic acid, acetic anhydride and the like, optionally mixed with an acid catalyst such as sulphuric acid. Further details on processes for epoxidizing elastomeric polymers are described, for example, in U.S. Pat. No. 4,341,672 or by Schulz et al. in "Rubber Chemistry and Technology", Vol. 55, pages 809 et seq.

Polymers containing epoxide groups which may also be used are elastomeric copolymers of one or more monoolefins with an olefinic comonomer containing one or more epoxide groups. The monoolefins can be chosen from: ethylene and α-olefins generally containing from 3 to 12 carbon atoms, such as, for example: propylene, 1-butene, 1-pentene, 1-hexene, 1-octene and the like, or mixtures thereof. The following are preferred: copolymers of ethylene and an α-olefin, and optionally a diene; homopolymers of isobutene or copolymers thereof with smaller amounts of a diene, which are optionally at least partially halogenated. The diene optionally present contains, in general, from 4 to 20 carbon atoms, and is preferably chosen from: 1,3-butadiene, isoprene, 1,4-hexadiene, 1,4-cyclohexadiene, 5-ethylidene-2-norbornene, 5-methylene-2-norbornene and the like. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; and the like, or mixtures thereof. Olefinic comonomers containing epoxide groups may be chosen, for example, from: glycidyl acrylate, glycidyl methacrylate, vinylcyclohexene monoxide, allyl glycidyl ether and methallyl glycidyl ether. The introduction of the epoxide groups by the abovementioned epoxidized comonomers can be carried out by copolymerization of the corresponding monomers according to known techniques, in particular by radical copolymerization in emulsion. When a diene comonomer is present, it can be used to introduce epoxide groups by means of an epoxidation reaction as described above.

Examples of epoxidized elastomeric polymers which can be used in the present invention and which are currently commercially available are the Epoxyprene® products from Guthrie (epoxidized natural rubber—ENR) and the Poly BD® products from Elf Atochem (epoxidized polybutadiene).

According to one particularly preferred embodiment, the said epoxidized elastomeric polymer is epoxidized natural rubber (ENR).

The amount of elastomeric polymer functionalized with at least one group chosen from epoxide and carboxyl which is present in the elastomeric material which is crosslinkable with sulphur varies as a function of the amount of functional groups present and of the elastic properties which it is desired to obtain for the final product. In general, the amount of the said functionalized elastomeric polymer is between 10 phr and 100 phr, preferably between 15 phr and 100 phr.

For the purpose of the present description and the claims, the term "phr" means the parts by weight of a given component of the compound per 100 parts by weight of polymer base.

The elastomeric material which is crosslinkable with sulphur can optionally comprise at least one other diene elastomer, of natural or synthetic origin, chosen, for example, from: natural rubber; polybutadiene; polyisoprene;

styrene/butadiene copolymers; butadiene/isoprene copolymers; styrene/isoprene copolymers; butyl rubbers or halobutyl rubbers; nitrile rubbers; ethylene/propylene copolymers; ethylene/propylene/unconjugated diene (such as, for example, norbornene, cyclooctadiene or dicyclopentadiene) terpolymers; and the like, or mixtures thereof. Natural rubber is preferred.

Said elastomeric material which is crosslinkable with sulphur also comprises a sulphur-based vulcanizing system chosen from those commonly used for diene elastomers, generally comprising a sulphur-based vulcanizing agent together with one or more vulcanization activators and/or accelerators.

The vulcanizing agent most advantageously used is sulphur, or molecules containing sulphur (sulphur donors), with accelerators or activators that are known to those skilled in the art.

Activators that are particularly effective are zinc compounds and in particular ZnO, $ZnCO_3$ and zinc salts of saturated or unsaturated fatty acids containing from 8 to 18 carbon atoms, such as, for example, zinc stearate, which are preferably formed in situ in the mixture from ZnO and fatty acid. Other activators may be chosen from: BiO, PbO, $Pb_3O_4$, $PbO_2$ and mixtures thereof.

Accelerators commonly used may be chosen from: dithiocarbamates, guanidine, thiourea, thiazoles, sulphenamides, thiourams, amines, xanthates and the like, or mixtures thereof.

Said elastomeric material which is crosslinkable with sulphur may comprise at least one reinforcing filler (for example carbon black, silica, alumina, aluminosilicates, calcium carbonate, kaolin and the like, or mixtures thereof), in addition to other conventional components such as antioxidants, anti-ageing agents, protective agents, plasticizers, compatibilizing agents for the reinforcing filler, adhesives, anti-ozone agents, modifying resins, fibres (for example Kevlar® pulp) and lubricants (for example mineral oils, vegetable oils, synthetic oils and the like, or mixtures thereof).

The abovementioned elastomeric materials may be prepared by mixing the polymer components with the reinforcing filler optionally present and with the other additives according to techniques that are known in the art. The mixing can be carried out, for example, using an open-mill mixer or an internal mixer of the type with tangential rotors (Banbury) or interlocking rotors (Intermix), or in continuous mixers of the Ko-Kneader (Buss) type or co-rotating or counter-rotating twin-screw type.

Figure 1:
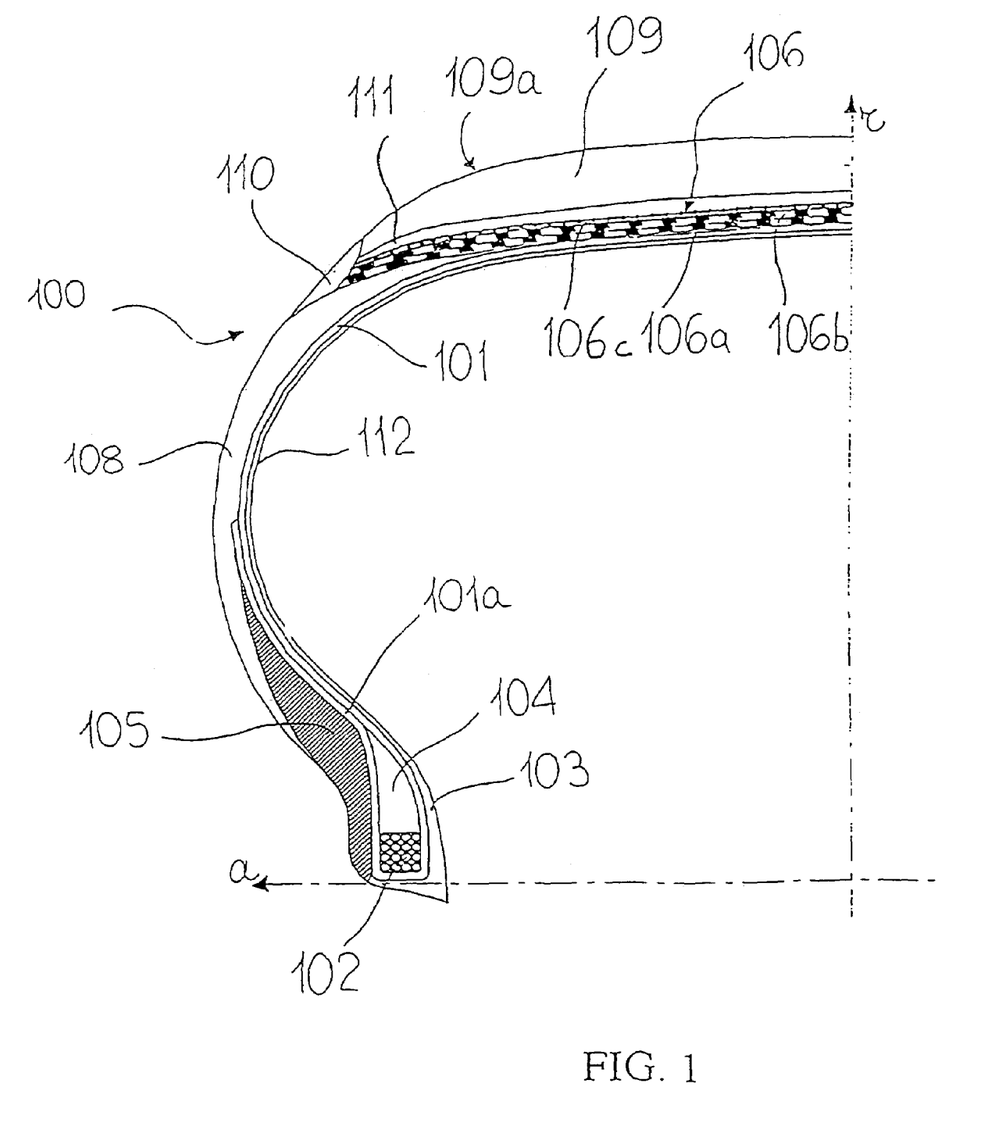

The present invention will now be illustrated in further detail by means of a number of preparation examples, with reference to the attached FIG. 1, which is a view in cross section of a portion of a tyre made according to the invention.

With "a" is indicated an axial direction, with "r" is indicated a radial direction. For simplicity, FIG. 1 shows only a portion of the tyre, the remaining portion not represented being identical and symmetrically arranged with respect to the radial direction "r".

The tyre (100) comprises at least one rubber-coated carcass ply (101), the opposite lateral edges of which are associated with respective bead wires (102). The coupling between carcass ply (101) and bead wires (102) is usually achieved by folding back the opposite lateral edges of the carcass ply (101) around the bead wires (102) so as to form so-called carcass back-folds (101a) as shown in FIG. 1.

Alternatively, the conventional bead wires (102) can be replaced with a pair of circumferentially unextensible annular inserts formed by elongate components arranged in concentric coils (not represented in FIG. 1) (see, for example, the abovementioned European patent applications EP 928,680 and EP 928,702). In this case, the carcass ply (101) is not back-folded around said annular inserts, the coupling being provided by a second carcass ply (not represented in FIG. 1) applied externally over the first.

The rubber-coated carcass ply (101) generally consists of a plurality of reinforcing cords arranged parallel to each other and at least partially coated with a layer of an elastomeric mixture. These reinforcing cords usually consist of steel wires which are stranded together, coated with a metal alloy (for example copper/zinc, zinc/manganese, zinc/molybdenum/cobalt alloys and the like).

The rubber-coated carcass ply (101) is usually of radial type, i.e. it incorporates reinforcing cords arranged in a direction substantially perpendicular with respect to a circumferential direction. Each bead wire (102) is enclosed in a bead (103), defined along an inner circumferential edge of the tyre (100), with which the tyre engages on a rim (not represented in FIG. 1) forming part of a vehicle wheel. The space defined by each carcass back-fold (101a) contains a bead filling (104) in which the bead wires (102) are embedded. An antiabrasive strip (105) is usually placed in an axially external position relative to the carcass back-fold (101a).

A belt structure (106) is applied along the circumferential extension of the rubber-coated carcass ply (101). In the particular embodiment according to FIG. 1, the belt structure (106) comprises two belt strips (106a, 106b) which incorporate a plurality of reinforcing cords, typically metal cords, parallel to each other in each strip and intersecting with respect to the adjacent strip, oriented so as to form a predetermined angle relative to a circumferential direction. The belt structure (106) can optionally comprise at least one reinforcing layer (106c) at 0°, commonly known as a "0° belt", placed on the radially outermost belt strip (106b), which generally incorporates a plurality of reinforcing cords, typically textile cords, arranged at an angle of a few degrees with respect to a circumferential direction, and coated and welded together by means of an elastomeric material.

A sidewall (108) is also applied externally onto the rubber-coated carcass ply (101), this sidewall extending, in an axially external position, from the bead (103) to the end of the belt structure (106).

A tread band (109), whose lateral edges are connected to the sidewalls (108), is applied circumferentially in a position radially external to the belt structure (106). Externally, the tread band (109) has a rolling surface (109a) designed to come into contact with the ground. Circumferential grooves which are connected by transverse notches (not represented in FIG. 1) so as to define a plurality of blocks of various shapes and sizes distributed over the rolling surface (109a) are generally made in this surface (109a), which is represented for simplicity in FIG. 1 as being smooth.

A strip made of elastomeric material (110), commonly known as a "mini-sidewall", may optionally be present in the connecting zone between the sidewalls (108) and the tread band (109), which is generally obtained by coextrusion with the tread band and improves the mechanical interaction between the tread band (109) and the sidewalls (108). Alternatively, the end portion of the sidewall (108) directly covers the lateral edge of the tread band (109). A underlayer which forms, together with the tread band (109), a structure commonly known as a "cap and base" (not represented in FIG. 1) may optionally be placed between the belt structure (106) and the tread band (109).

A layer of elastomeric material (111) which serves as an "attachment sheet", i.e. a sheet capable of providing the connection between the tread band (109) and the belt structure (106), may be placed between the tread band (109) and the belt structure (106).

In the case of tubeless tyres, a rubber layer (112) generally known as a "liner", which provides the necessary impermeability to the inflation air of the tyre, may also be provided in a radially internal position with respect to the rubber-coated carcass ply (101).

The process for producing the tyre according to the present invention can be carried out according to techniques and using apparatus that are known in the art, as described, for example, in patents EP 199,064, U.S. Pat. Nos. 4,872,822 and 4,768,937, said process including at least one step of manufacturing the green tyre and at least one step of vulcanizing this tyre.

More particularly, the process for producing the tyre comprises the steps of preparing beforehand and separately from each other a series of semi-finished articles corresponding to the various parts of the tyre (carcass plies, belt strips, bead wires, fillers, sidewalls and tread band) which are then combined together using a suitable manufacturing machine. Next, the subsequent vulcanization step welds the abovementioned semi-finished articles together to give a monolithic block, i.e. the finished tyre.

Naturally, the step of preparing the above mentioned semi-finished articles is preceded by a step of preparing and moulding the various mixtures which are the constituents of said semi-finished articles, according to conventional techniques.

The green tyre thus obtained is then passed to the subsequent steps of moulding and crosslinking. To this end, a vulcanization mould is used which is designed to receive the tyre being processed inside a moulding cavity having walls which are countermoulded to the outer surface of the tyre when the crosslinking is complete.

Alternative processes for producing a tyre or parts of a tyre without using semi-finished articles are disclosed, for example, in the abovementioned patent applications EP 928,680 and EP 928,702.

The green tyre can be moulded by introducing a pressurized fluid into the space defined by the inner surface of the tyre, so as to press the outer surface of the green tyre against the walls of the moulding cavity. Ins one of the moulding methods widely practised, a vulcanization chamber made of elastomeric material, filled with steam and/or another fluid under pressure, is inflated inside the tyre closed inside the moulding cavity. In this way, the green tyre is pushed against the inner walls of the moulding cavity, thus obtaining the desired moulding. Alternatively, the moulding can be carried out without an inflatable vulcanization chamber, by providing inside the tyre a toroidal metal support shaped according to the configuration of the inner surface of the tyre to be obtained (see, for example, patent EP 242,840). The difference in coefficient of thermal expansion between the toroidal metal support and the crude elastomeric material is exploited to achieve an adequate moulding pressure.

At this point, the step of crosslinking of the crude elastomeric material present in the tyre is carried out. To this end, the outer wall of the vulcanization mould is brought into contact with a heating fluid (generally steam) such that the outer wall reaches a maximum temperature generally of between 100° C. and 230° C. Simultaneously, the inner surface of the tyre is brought to the crosslinking temperature using the same pressurized fluid used to press the tyre against the walls of the moulding cavity, heated to a maximum temperature of between 100 and 250° C. The time required to obtain a satisfactory degree of crosslinking throughout the mass of the elastomeric material can vary in general between 3 min and 90 min and depends mainly on the dimensions of the tyre. When the vulcanization is complete, the tyre is removed from the vulcanization mould.

Although the present invention has been illustrated in relation to a tyre, the crosslinked elastomeric products described above may be conveyor belts, driving belts, flexible tubes, etc.

The present invention will be further illustrated below by means of a number of preparation examples, which are given for purely indicative purposes and without any limitation of this invention.

EXAMPLES 1–9

Preparation of the Mixtures

The elastomeric compositions given in Table 1 and Table 2 were prepared using a tangential internal mixer (the amounts of the various components are expressed in phr), with a mixing time of about 8 minutes, while keeping the maximum temperature at about 140° C.

Mixture A is an elastomeric composition which is vulcanizable without sulphur (according to the abovementioned patent application 99EP-116676.0 of Aug. 26, 1999) which can be used to make the tread band, while mixture B is an elastomeric composition commonly used to make the rubber layer of the 0° belt. The mixtures given in Table 2 were obtained by blending the compounds A–C of Table 1 in the internal mixer in the proportions given in this Table 2.

TABLE 1

| Composition | A | B | C | D | E | F |
|---|---|---|---|---|---|---|
| ENR 25 | — | — | — | 50 | 75 | 100 |
| ENR 50 | — | — | 100 | — | — | — |
| NR | — | 100 | — | 50 | 25 | — |
| XNBR | 100 | — | — | — | — | — |
| SiO$_2$ | 70 | — | 70 | — | — | — |
| N327 | — | 54 | — | 54 | 54 | 54 |
| PARAPLEX ® G-60 | 70 | — | — | — | — | — |
| POLYPLASTOL ® 6 | 3 | — | — | — | — | — |
| AROMATIC OIL | — | 5 | — | 5 | 5 | 5 |
| HMT | — | 1.54 | — | 1.54 | 1.54 | 1.54 |
| RESORCINOL | — | 1.2 | — | 1.2 | 1.2 | 1.2 |
| SULPHUR | — | 1.8 | — | 1.8 | 1.8 | 1.8 |
| CBS | — | 1 | — | 1 | 1 | 1 |
| ZnO | — | 6 | — | 6 | 6 | 6 |
| 6-PPD | 2 | — | — | — | — | — |
| TMQ | 1 | — | — | — | — | — |

TABLE 2

| Composition | G | H | J | K | L |
|---|---|---|---|---|---|
| Composition A | 75 | 50 | — | — | — |
| Composition B | 25 | 50 | 25 | 50 | 75 |
| Composition C | — | — | 75 | 50 | 25 |

ENR 25: epoxidized natural rubber containing 25 mol % of epoxide groups (Epoxyprene® 25 from Guthrie);

ENR 50: epoxidized natural rubber containing 50 mol % of epoxide groups (Epoxyprene® 50 from Guthrie);

NR: natural rubber;

XNBR: acrylonitrile-butadiene-carboxylated monomer terpolymer containing 28% by weight of acrylonitrile and 7.5% by weight of carboxylic groups (NIPOL® 1072 from Nippon Zeon);

N327: carbon black;

Paraplex® G-60 (C. P. Hall): epoxidized soybean oil having: freezing point=5° C., average molecular weight=1000 and epoxide equivalent weight=210;

Polyplastol® 6: mixture of zinc salts of fatty acids (Great Lakes Chemical Corp.);

HMT: hexamethylenetetramine;

CBS: sulphenamide (accelerator);

6-PPD: Santoflex® 13 from Monsanto (antioxidant)

TMQ: amine antioxidant.

Adhesion (Peeling) Tests

Using the compositions obtained as described above, two-layer test pieces were prepared for measuring the peel force, by superimposing two layers of different non-crosslinked mixtures, followed by crosslinking. The various combinations tested are given in Table 3.

In detail, the test pieces were prepared as follows. Each mixture was calendered so as to obtain a sheet with a thickness equal to 3 mm±0.2 mm. From the sheet thus produced were obtained plates with dimensions equal to 220 mm (±1.0 mm)×220 mm (±1.0 mm)×3 mm (±0.2 mm), marking the direction of the calendering. One side of each plate was protected with a polyethylene sheet, while a reinforcing fabric made of rubberized polyamide with a thickness of 0.88 mm±0.05 mm was applied to the opposite side, orienting the strands in the direction of calendering and rolling the composite thus assembled so as to achieve good adhesion between the fabric and the crude elastomeric material. After cooling, sheets were produced from the composite thus obtained, by punching, these sheets having dimensions equal to 110 mm (±1.0 mm)×25 mm (±1.0 mm)×3.88 mm (±0.05 mm), taking care to ensure that the major axis of each sheet was oriented in the direction of the strands of the fabric.

A first sheet constituting the first layer was placed in a mould, the polyethylene film was removed, two Mylar® strips acting as lateral separators (thickness=0.2 mm) were applied laterally and a third strip again made of Mylar® (thickness=0.045 mm) was applied to one extremity of the sheet in order to create a short free section not adhering to the second layer. A second sheet, from which the polyethylene film was first removed, was then applied to the first sheet thus prepared, constituting the second layer, thus obtaining a test piece which was then crosslinked by heating at 200° C. for 15 minutes in a press.

Subsequently, the test pieces crosslinked as described above were conditioned at room temperature (23° C.±2° C.) for at least 16 hours and were then subjected to the peel test using an Instron 4202 dynamometer, the clamps of which were applied to the free section of each layer. A traction speed equal to 260 mm/min±20 mm/min was then applied and the peel force values thus measured, expressed in Newtons (N), are given in Table 3 and are each the average value calculated for 4 test pieces. For each example, the elastomeric composition used for the first layer and for the second layer is given, using the same symbols as in Tables 1 and 2.

TABLE 3

| Example No. | First layer | Second layer | Peel force (N) |
|---|---|---|---|
| 1 | A | B | 12.0 |
| 2 | A | D | 43.0 |
| 3 | A | E | 40.5 |
| 4 | A | F | 60.0 |
| 5 | A | G | 79.0 |
| 6 | A | H | 44.0 |
| 7 | A | J | 91.0 |
| 8 | A | K | 79.0 |
| 9 | A | L | 46.0 |

By examining the data given in Table 3, it may be seen that the first layer obtained using composition A (vulcanized without sulphur) shows good attachment to the second layer under each of the following conditions:

when said second layer was obtained using compositions D, E and F (comprising the epoxidized elastomeric polymer and carbon black as reinforcing filler);

when said second layer was obtained using compositions G and H (comprising the carboxylated elastomeric polymer);

and when said second layer was obtained using compositions J, K and L (comprising the epoxidized elastomeric polymer and silica as reinforcing filler).

EXAMPLE 10

A tyre according to the invention of the type Pirelli® P6000® 195/65 R15 was made using composition A for the tread band, composition B for the rubber of the 0° belt and composition E for the attachment sheet placed between the 0° belt and the tread band.

The abovementioned tyre was subjected to a strength test at high velocity. To this end, the tyre, at an inflation pressure of 2.7 bar, subjected to a load of 510 kg, was rotated on a drum with a diameter equal to 1.67 m: to ensure the minimum safety conditions, the tyre needs to exceed a minimum time of 60 minutes at 210 km/h. After this first check, the speed was increased by 10 km/h every 10 minutes until the tyre failed.

After withstanding 210 km/h for 60 minutes without failure, the abovementioned tyre was subjected to velocities increasing as indicated above, and showed obvious signs of yielding only after 8 minutes at 240 km/h.

The invention claimed is:

1. A crosslinked elastomeric product, comprising:
   at least one first component; and
   at least one second component;
   wherein the at least one first component comprises a first elastomeric material crosslinked in substantial absence of sulfur,
   wherein the at least one second component comprises a second elastomeric material crosslinked with sulfur,
   wherein the at least one first component is in contact with the at least one second component,
   wherein the first elastomeric material comprises an elastomeric polymer comprising carboxylic groups,
   wherein the first elastomeric material is crosslinked by reacting the elastomeric polymer comprising carboxylic groups with an epoxidized liquid organic compound,
   wherein the epoxidized liquid organic compound comprises epoxide groups located internally along a molecule of the epoxidized liquid organic compound, and wherein the second elastomeric material comprises at least one elastomeric polymer functionalized with at least one epoxide group, at least one carboxylic group, or at least one epoxide group and at least one carboxylic group.

2. The elastomeric product of claim 1, wherein the elastomeric polymer comprising carboxylic groups is a homopolymer or copolymer with elastomeric properties comprising a glass transition temperature less than 23° C.

3. The elastomeric product of claim 1, wherein the epoxidized liquid organic compound comprises an epoxide equivalent weight greater than or equal to 40 and less than or equal to 2,000.

4. The elastomeric product of claim 1, wherein the second elastomeric material comprises at least one elastomeric polymer comprising epoxide groups, and
wherein the at least one elastomeric polymer comprising epoxide groups is a homopolymer or copolymer with elastomeric properties comprising a glass transition temperature less than 23° C.

5. A method for coupling a first component with a second component, comprising:
bringing the first component into contact with the second component; and
crosslinking elastomeric materials of the first component and the second component by heating the components to a predetermined temperature for a predetermined time;
wherein the first component comprises a first elastomeric material crosslinked to substantial absence of sulfur,
wherein the second component comprises a second elastomeric material crosslinked with sulfur,
wherein the first elastomeric material comprises an elastomeric polymer comprising carboxylic groups,
wherein the first elastomeric material further comprises an epoxidized liquid organic compound comprising epoxide groups located internally along a molecule of the epoxidized liquid organic compound, and
wherein the second elastomeric material comprises at least one elastomeric polymer functionalized with at least one epoxide group, at least one carboxylic group, or at least one epoxide group and at least one carboxylic group.

6. The method of claim 5, wherein crosslinking elastomeric materials comprises heating the first and second elastomeric materials to a temperature greater than or equal to 100° C. and less than or equal to 250° C.

7. The method of claim 5, wherein crosslinking elastomeric materials comprises heating the first and second elastomeric materials to a temperature greater than or equal to 120° C. and less than or equal to 200° C.

8. The method of claim 5, wherein the elastomeric polymer comprising carboxylic groups is a homopolymer or copolymer with elastomeric properties comprising a glass transition temperature less than 23° C.

9. The method of claim 5, wherein the epoxidized liquid organic compound comprises an epoxide equivalent weight greater than or equal to 40 and less than or equal to 2,000.

10. The method of claim 5, wherein the second elastomeric material comprises at least one elastomeric polymer comprising epoxide groups, and
wherein the at least one elastomeric polymer comprising epoxide groups is a homopolymer or copolymer with elastomeric properties comprising a glass transition temperature less than 23° C.

11. A tyre for a vehicle wheel, comprising:
at least one first component; and
as least one second component;
wherein the at least one first component comprises a first elastomeric material crosslinked in substantial absence of sulfur,
wherein the at least one second component comprises a second elastomeric material crosslinked with sulfur,
wherein the at least one first component is in contact with the at least one second component,
wherein the first elastomeric material comprises an elastomeric polymer comprising carboxylic groups,
wherein the first elastomeric material is crosslinked by reacting the elastomeric polym comprising carboxylic groups with an epoxidized liquid organic compound,
wherein the epoxidized liquid organic compound comprises epoxide groups located internally along a molecule of the epoxidized liquid organic compound, and
wherein the second elastomeric material comprises at least one elastomeric polymer functionalized with at least one epoxide group, at least one carboxylic group, or at least one epoxide group and as least one carboxylic group.

12. The tyre of claim 11, comprising:
at least one carcass ply;
a belt structure;
a tread band; and
a pair of sidewalls;
wherein opposite lateral edges of the at least one carcass ply are associated with respective bead wires,
wherein the bead wires are encased in respective beads of the at least one carcass ply,
wherein the belt structure comprises at least one belt strip applied along a circumferential extension of the at least one carcass ply,
wherein the tread band is applied along a circumferential extension of the belt structure,
wherein the sidewalls are applied externally to the at least one carcass ply,
wherein the sidewalls extend, in an axially-external position, from the respective beads to respective ends of the belt structure, and
wherein the at least one first component is the tread band.

13. The tyre of claim 12, wherein the second component is a reinforcing layer placed between the belt structure and the tread band, and
wherein the reinforcing layer comprises a plurality of reinforcing cords coated and joined together by the second elastomeric material.

14. The tyre of claim 13, further comprising strips disposed in respective connecting zones between the sidewalls and the tread band;
wherein the strips comprise the second elastomeric material.

15. The tyre of claim 12, wherein the at least one second component is a layer of the second elastomeric material, and
wherein the layer of the second elastomeric material is disposed between the tread band and the belt structure.

16. The tyre of claim 11, wherein the second elastomeric material comprises as least one elastomeric polymer functionalized with at least one epoxide group.

17. The tyre of claim 11, wherein the elastomeric polymer comprising carboxylic groups is a homopolymer or copolymer with elastomeric properties comprising a glass transition temperature less than 23° C.

18. The tyre of claim 11, wherein the elastomeric polymer comprising carboxylic groups comprises at least 0.1 mol % of carboxylic groups relative to a total number of moles of monomers present in the elastomeric polymer comprising carboxylic groups.

19. The tyre of claim 11, wherein the elastomeric polymer comprising carboxylic groups comprises greater than or equal to 1 mol % and less than or equal to 30 mol % of carboxylic groups relative to a total number of moles of monomers present in the elastomeric polymer comprising carboxylic groups.

20. The tyre of claim 11, wherein the elastomeric polymer comprising carboxylic groups comprises an average molecular weight greater than or equal to 2,000 and less than or equal to 1,000,000.

21. The tyre of claim 11, wherein the elastomeric polymer comprising carboxylic groups comprises an average molecular weight greater than or equal to 50,000 and less than or equal to 500,000.

22. The tyre of claim 11, wherein the elastomeric polymer comprising carboxylic groups is a carboxylated diene homopolymer or copolymer, and
wherein a base polymer structure of the carboxylated diene homopolymer or copolymer is derived from one or more conjugated diene monomers, optionally copolymerized with monovinylarenes, polar comonomers, or monovinylarenes and polar comonomers.

23. The tyre of claim 22, wherein the base polymer structure is one or more of natural rubber, polybutadiene, polyisoprene, styrene/butadiene copolymers, butadiene/isoprene copolymers, styrene/isoprene copolymers, and butadiene/acrylonitrile copolymers.

24. The tyre of clams 11, wherein the elastomeric polymer comprising carboxylic groups is an elastomeric copolymer of one or more monoolefins with an olefinic comonomer comprising one or more carboxylic groups or derivatives thereof.

25. The tyre of claim 11, wherein the elastomeric polymer comprising carboxylic groups is carboxylated butadiene-acrylonitrile rubber.

26. The tyre of claim 11, wherein the epoxidized liquid organic compound comprises an epoxide equivalent weight greater than or equal to 40 and less than or equal to 2,000.

27. The tyre of claim 11, wherein the epoxidized liquid organic compound comprises an epoxide equivalent weight greater than or equal to 50 and less than or equal to 1,500.

28. The tyre of claim 11, wherein the epoxidized liquid organic compound is an epoxidized oil.

29. The tyre of claim 28, wherein the epoxidized oil comprises a freezing temperature less than 23° C.

30. The tyre of claim 11, wherein the epoxidized liquid organic compound is an epoxidized diene oligomer, and
wherein a base polymer structure of the epoxidized diene oligomer derived from one or more conjugated diene monomers, optionally copolymerized with other monomers comprising ethylenic unsaturation.

31. The tyre of claim 30, wherein the epoxidized diene oligomer comprises an average molecular weight greater than or equal to 500 and less than or equal to 10,000.

32. The tyre of claim 30, wherein the epoxidized diene oligomer comprises an average molecular weight greater than or equal to 1,000 and less than or equal to 8,000.

33. The tyre of claim 30, wherein the epoxidized diene oligomer is derived from epoxidation of oligomers of 1,3-butadiene; isoprene; 1,3-butadiene and styrene; 1,3-butadiene and isoprene; isoprene and styrene; or 1,3-butadiene and acrylonitrile.

34. The tyre of claim 11, wherein the second elastomeric material comprises at least one elastomeric polymer comprising epoxide groups, and
wherein the at least one elastomeric polymer comprising epoxide groups is a homopolymer or copolymer with elastomeric properties comprising a glass transition temperature less than 23° C.

35. The tyre of claim 11, wherein the second elastomeric material comprises at least one elastomeric polymer comprising epoxide groups, and
wherein the at least one elastomeric polymer comprising epoxide groups comprises at least 0.05 mol % of epoxide groups relative to a total number of moles of monomers present in the elastomeric polymer comprising epoxide groups.

36. The tyre of claim 11, wherein the second elastomeric material comprises at least one elastomeric polymer comprising epoxide groups, and
wherein the at least one elastomeric polymer comprising epoxide groups comprises greater than or equal to 0.1 mol % and less than or equal to 70 mol % of epoxide groups relative to a total number of motes of monomers present in the elastomeric polymer comprising epoxide groups.

37. The tyre of claim 11, wherein the second elastomeric material comprises at least one elastomeric polymer comprising epoxide groups, and
wherein the at least one elastomeric polymer comprising epoxide groups comprises an average molecular weight greater than or equal to 2,000 and less than or equal to 1,000,000.

38. The tyre of claim 11, wherein the second elastomeric material comprises at least one elastomeric polymer comprising epoxide groups, and
wherein the at least one elastomeric polymer comprising epoxide groups comprises average molecular weight greater than or equal to 50,000 and less than or equal to 500,000.

39. The tyre of claim 11, wherein the second elastomeric material comprises at least one elastomeric polymer comprising epoxide groups,
wherein the at least one elastomeric polymer comprising epoxide groups is an epoxidized diene homopolymer or copolymer, and
wherein a base polymer structure of the elastomeric polymer comprising epoxide groups is derived from one or more conjugated diene monomers, optionally copolymerized with monovinylarenes, polar comonomers, or monovinylarenes and polar comonomers.

40. The tyre of claim 39, wherein the base polymer structure is one or more of natural rubber, polybutadiene, polyisoprene, styrene/butadiene copolymers, butadiene/isoprene copolymers styrene/isoprene copolymers, and nitrile rubbers.

41. The tyre of claim 11, wherein the second elastomeric material comprises at least one elastomeric polymer comprising epoxide groups, and
wherein the at least one elastomeric polymer comprising epoxide groups is chosen from elastomeric copolymers of one or more monoolefins with an olefinic comonomer comprising one or more epoxide groups.

42. The tyre of claim 11, wherein the second elastomeric material comprises at least one elastomeric polymer comprising epoxide groups, and
wherein the at least one elastomeric polymer comprising epoxide groups is epoxidized natural rubber.

43. The tyre of claim 11, wherein an amount of esoteric polymer functionalized with at least one epoxide group, at least one carboxylic group, or at least one epoxide group and at least one carboxylic group, is greater than or equal to 10 phr and less than or equal to 100 phr.

44. The tyre of claim 11, wherein an amount of elastomeric polymer functionalized with at least one epoxide group, at least one carboxylic group, or at least one epoxide group and at least one carboxylic group, is greater than or equal to 15 phr and less than or equal to 100 phr.

45. The tyre of claim 11, wherein the second elastomeric material comprises at least one other diene elastomer comprising one or more of natural rubber; polybutadiene; polyisoprene; styrene/butadiene copolymers; butadiene/isoprene copolymers; styrene/isoprene copolymers; butyl rubbers or halobutyl rubbers; nitrile rubbers; and terpolymers of ethylene, propylene, and non-conjugated dienes such as norbornene, cyclooctadiene, or dicyclopentadiene.

46. A process producing a tyre for a vehicle wheel, comprising:
    manufacturing a tyre comprising at least one first component and at least one second component;
    moulding the tyre in a cavity defined in a vulcanization mould; and
    crosslinking elastomeric materials of the at least one first component and the at least one second component by heating the tyre to a predetermined temperature for a predetermined time;
    wherein the at least one first component comprises a first elastomeric material crosslinked in substantial absence of sulfur,
    wherein the at least one second component comprises a second elastomeric material crosslinked with sulfur,
    wherein the at least one first component is in contact with the at least one second component,
    wherein the first elastomeric material comprises an elastomeric polymer comprising carboxylic groups,
    wherein the first elastomeric material further comprises an epoxidized liquid organic compound comprising epoxide groups located internally along a molecule of the epoxidized liquid organic compound, and
    wherein the second elastomeric material comprises at least one elastomeric polymer functionalized with at least one epoxide group, at least one carboxylic group, or at least one epoxide group and at least one carboxylic group.

47. The process of claim 46, wherein crosslinking elastomeric materials comprises heating the first and second elastomeric materials to a temperature greater than or equal to 100° C. and less than or equal to 250° C.

48. The process of claim 46, wherein crosslinking elastomeric material comprises heating the first and second elastomeric materials to a temperature greater than or equal to 120° C. and less than or equal to 200° C.

49. The process of claim 46, wherein the elastomeric polymer comprising carboxylic groups is a homopolymer or copolymer with elastomeric properties comprising a glass transition temperature less than 23° C.

50. The process of claim 46, wherein the epoxidized liquid organic compound comprises an epoxide equivalent weight greater than or equal to 40 and less than or equal to 2,000.

51. The process of claim 46, wherein the second elastomeric material comprises at least one elastomeric polymer comprising epoxide groups, and
    wherein the at least one elastomeric polymer comprising epoxide groups is a homopolymer or copolymer with elastomeric properties comprising a glass transition temperature less than 23° C.

* * * * *

UNITED STATES PATENT AND TRADEMARK OFFICE
CERTIFICATE OF CORRECTION

PATENT NO. : 7,152,642 B2
APPLICATION NO. : 10/381313
DATED : December 26, 2006
INVENTOR(S) : Antonio Serra et al.

It is certified that error appears in the above-identified patent and that said Letters Patent is hereby corrected as shown below:

Title Page add the following item, --(60) Provisional application No. 60/236,736, filed on Oct. 2, 2000--.

Column 17, line 31, "to substantial absence" should read --in substantial absence--.

Column 18, line 14, "polym" should read --polymer--.

Column 18, line 22, "as least" should read --at least--.

Column 18, line 60, "as least" should read --at least--.

Column 19, line 31, "clams 11," should read --claim 11,--.

Column 20, line 22, "motes" should read --moles--.

Column 20, line 36, "comprises average" should read --comprises an average--.

Column 20, line 54, "copolymers styrene/isoprene" should read --copolymers, styrene/isoprene--.

Column 21, line 1, "esoteric" should read --elastomeric--.

Column 21, line 19, "A process producing" should read --A process for producing--.

UNITED STATES PATENT AND TRADEMARK OFFICE
CERTIFICATE OF CORRECTION

PATENT NO. : 7,152,642 B2
APPLICATION NO. : 10/381313
DATED : December 26, 2006
INVENTOR(S) : Antonio Serra et al.

It is certified that error appears in the above-identified patent and that said Letters Patent is hereby corrected as shown below:

Column 22, line 16, "material" should read --materials--.

Signed and Sealed this

Eighteenth Day of September, 2007

JON W. DUDAS
*Director of the United States Patent and Trademark Office*